United States Patent Office 2,962,521
Patented Nov. 29, 1960

2,962,521

METHOD FOR PURIFICATION OF ORGANO PHOSPHORIC ACID ESTER

Motomu Usui, Osaka, Japan, assignor to Sumitomo Chemical Company Ltd., Osaka, Japan, a corporation of Japan No Drawing. Filed Nov. 19, 1958, Ser. No. 774,834

Claims priority, application Japan Nov. 26, 1957

6 Claims. (Cl. 260—461)

This invention relates to phosphate-containing pesticides. More particularly, it relates to an improved method for decolorizing and deodorizing dithiophosphate pesticides and for stabilizing such pesticides against formation therein of objectionable color and odor bodies.

Dithiophosphate pesticides of the type with which the present invention is concerned may be represented by the formula:

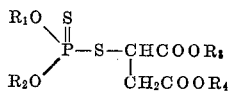

in which $R_1$, $R_2$, $R_3$, and $R_4$ are each an aliphatic or aromatic hydrocarbon radical. Such esters are well known and may be conveniently prepared, for instance, by reacting an O,O-dialkyl dithiophosphate with a dialkyl maleate as described and claimed in United States Letters Patent No. 2,578,652. A typical and well known ester of this class is O,O-dimethyl-S-(1,2-dicarbethoxyethyl)-dithiophosphate which is commercially available as "Malathion." It is with this latter compound that the present invention is particularly concerned and to which the following description is directed. Nevertheless, it is to be understood that the present process of decolorization, deodorization and stabilization is equally as applicable to other dithiophosphate esters of the above class.

Technical grade dithiophosphate pesticides as presently manufactured are yellow brown to brown in color and give off a peculiarly offensive odor. Usually, the purity of such technical grade dithiophosphates is about 94%. When employed as insecticides for agricultural purposes, the color and odor of such compounds, while not desirable, do not unduly restrict their use. The color and odor of these compounds are sufficiently obnoxious however, to seriously hamper the use of these pesticides for public health purposes especially in or near households. Although various proposed methods of purification have offered some measure of improvement, none has proved wholly successful in providing a stabilized, substantially color- and odor-free pesticide. There has continued to remain, therefore, a need for a means for removing color and odor from technical grade dithiophosphate pesticides and for stabilizing such pesticides against further formation therein of objectionable color and odor bodies.

It is a primary object of this invention to fulfill this need. It is a further object of this invention to decolorize and deodorize technical grade dithiophosphate pesticides and to so stabilize them. It is a still further object of this invention to provide color- and odor-free dithiophosphate pesticides particularly adapted for use in or near households and public buildings for public health purposes.

These objects have been met to a surprising degree by a process which is simple and economical. In general, the process of the present invention comprises providing in an emulsion of a dithiophosphate ester and an aqueous alkali metal hydroxide or carbonate a small amount of a peroxide or hydroperoxide. After agitation for a period of time, the mixture is permitted to stratify. The oil layer separated, washed and dried to give a color- and odor-free dithiophosphate ester.

It is an advantage of the invention that the process thereof may be practiced either on a technical grade dithiophosphate pesticide or during the manufacture thereof. In the latter case, an aqueous alkali metal carbonate or hydroxide is added, for example, to the reaction mixture of an O,O-dialkyl dithiophosphoric acid and a dialkyl maleate and the mixture agitated to form an emulsion. To this is added with agitation a peroxide or hydroperoxide. After thorough distribution, the mixture is stratified and the oil layer separated, washed and dried.

The aqueous alkali metal carbonate or hydroxide in which the dithiophosphate is emulsified will usually be soda ash or caustic soda, although this may be otherwise varied as desired. The concentration of such an aqueous solution may vary considerably but generally will not be greater than about 10%. Usually from about a 2–10% aqueous solution will be employed. The amount of solution employed likewise will vary but will usually be at least about twice the weight of the dithiophosphate ester.

The amount of peroxide or hydroperoxide may also be varied. It has been found that as little as 0.01% on the weight of the dithiophosphate, when added to the emulsion, will result in a considerably improved product. Greater amounts may be employed with more effectiveness but little if any added advantage appears to be gained by employing more than about 1.5%. The usual practice will be to use about 0.1–1.0% of peroxide on the weight of the dithiophosphate ester.

Various peroxides and hydroperoxides, both organic and inorganic, may be employed. Illustrative of these are hydrogen peroxide, benzoyl peroxide, dibenzoyl peroxide, potassium peroxide, calcium peroxide, di-t-butyl peroxide, cumene hydroperoxide, pinene hydroperoxide, t-butyl hydroperoxide and the like.

The invention will be further illustrated by the following examples. All parts are by weight unless otherwise noted.

Example 1

100 parts of strongly smelling, yellowish brown O,O-dimethyl-S-(1,2-dicarbethoxyethyl)-dithiophosphate is emulsified in 200 parts of a 2% aqueous solution of soda ash vigorous agitation. 28 parts of a 3% aqueous solution of hydrogen peroxide are then added to the emulsion and agitation continued for an additional hour. Agitation is then discontinued, whereupon a lower oil layer is formed which is separated, washed with water and dried in vacuo to give 93.5 parts of substantially colorless and odorless O,O-dimethyl-S-(1,2-dicarbethoxyethyl)-dithiophosphate.

Example 2

The procedure of Example 1 is repeated except that O,O-diethyl-S-(1,2-dicarbethoxyethyl)-dithiophosphate is treated. Again, a substantially colorless and odorless product is obtained.

Example 3

The procedure of Example 1 is repeated except that the dithiophosphate is emulsified with sodium hydroxide and 0.5 part of cumene hydroperoxide is added to the emulsion. A colorless and odorless product is obtained.

Example 4

When the procedure of Example 1 is repeated using pinene hydroperoxide, di-t-butyl peroxide and t-butyl hydroperoxide, similar results are obtained.

I claim:

1. A method of obtaining a substantially color- and odor-free, stabilized pesticide of the formula

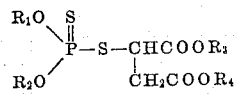

in which $R_1$, $R_2$, $R_3$ and $R_4$ are each selected from the group consisting of aliphatic and aromatic hydrocarbon radicals, which comprises: emulsifying said pesticide in an aqueous solution of a material selected from the group consisting of alkali metal hydroxides and carbonates, said emulsion having present therein at least about 0.01% of a peroxide on the weight of the pesticide and recovering therefrom a substantially color- and odor-free pesticide.

2. A method according to claim 1 in which the peroxide is present in an amount of 0.1–1.0%.

3. A method according to claim 1 in which the peroxide is hydrogen peroxide.

4. A method of obtaining a substantially color- and odor-free stabilized pesticide of the formula

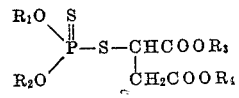

in which $R_1$, $R_2$, $R_3$ and $R_4$ are each selected from the group consisting of aliphatic and aromatic hydrocarbon radicals, which comprises: agitating said pesticide with an aqueuos solution of a material selected from the group consisting of alkali metal hydroxides and carbonates whereby an emulsion is formed, adding to said emulsion at least about 0.01% of a peroxide on the weight of pesticide, continuing agitation to thoroughly distribute said peroxide therein, stratifying said emulsion, separating the oil layer and washing and drying it.

5. A method according to claim 4 in which the peroxide is present in an amount of 0.1–1.0%.

6. A method according to claim 4 in which the peroxide is hydrogen peroxide.

References Cited in the file of this patent

UNITED STATES PATENTS 2,879,284   Divine et al. _____ Mar. 24, 1959